United States Patent
Kimura

(10) Patent No.: US 11,874,245 B2
(45) Date of Patent: Jan. 16, 2024

(54) PRODUCTION METHOD FOR SULFIDATION DETECTION SENSOR

(71) Applicant: KOA CORPORATION, Nagano (JP)

(72) Inventor: Taro Kimura, Nagano (JP)

(73) Assignee: KOA CORPORATION, Nagano (JP)

(*) Notice: Subject to any disclaimer, the term of this patent is extended or adjusted under 35 U.S.C. 154(b) by 148 days.

(21) Appl. No.: 17/604,082

(22) PCT Filed: Feb. 12, 2020

(86) PCT No.: PCT/JP2020/005324
§ 371 (c)(1),
(2) Date: Oct. 15, 2021

(87) PCT Pub. No.: WO2020/213243
PCT Pub. Date: Oct. 22, 2020

(65) Prior Publication Data
US 2022/0221414 A1    Jul. 14, 2022

(30) Foreign Application Priority Data

Apr. 17, 2019 (JP) ................ 2019-078848

(51) Int. Cl.
*C25D 7/00* (2006.01)
*G01N 27/12* (2006.01)
*C25D 5/02* (2006.01)

(52) U.S. Cl.
CPC ............ *G01N 27/12* (2013.01); *C25D 5/028* (2013.01); *C25D 7/00* (2013.01)

(58) Field of Classification Search
None
See application file for complete search history.

(56) References Cited

U.S. PATENT DOCUMENTS
2018/0174720 A1    6/2018    Lee

FOREIGN PATENT DOCUMENTS

| JP | H10300699 A | 11/1998 |
| JP | 2009158721 A | 7/2009 |
| JP | 2009250611 A | 10/2009 |
| WO | 2018123419 A1 | 7/2018 |

OTHER PUBLICATIONS

International Search Report related to Application No. PCT/JP2020/005324; dated Apr. 7, 2020.

*Primary Examiner* — Stefanie S Wittenberg
(74) *Attorney, Agent, or Firm* — von Briesen & Roper, s.c.

(57) ABSTRACT

After a sulfidation detection conductor (2) is formed on a front surface of a large-sized substrate (10A), a pair of first protective films (3) made of an insoluble material is formed, respectively, on predetermined positions of the sulfidation detection conductor (2), and a second protective film (7) made of a soluble material is formed so as to cover the sulfidation detection conductor (2) positioned between the pair of first protective films (3), and thereafter, end face electrodes (5) are formed, respectively, on divided faces of each strip-shaped substrate (10B) obtained by primarily dividing the large-sized substrate (10A). Then, after external electrodes (6) are formed by performing electrolytic plating with respect to each chip substrate (10C) obtained by secondarily dividing each strip-shaped substrate (10B), a sulfidation detection portion (2a) is exposed to the outside by removing the second protective film (7), whereby a sulfidation detection sensor (10) can be obtained.

4 Claims, 10 Drawing Sheets

PRODUCTION METHOD FOR SULFIDATION DETECTION SENSOR

TECHNICAL FIELD

The present invention relates to a method of manufacturing a sulfidation detection sensor capable of detecting a cumulative amount of sulfide in a corrosive environment.

As an internal electrode of an electronic component such as a chip resistor, generally, an Ag (silver) based electrode material having a low specific resistance is used. However, silver sulfide occurs when silver is exposed to sulfide gas and the silver sulfide is an insulator, which may result in malfunction such as disconnection of the electronic component. In recent years, measures against sulfidation, such as forming an electrode that hardly gets sulfurized by adding Pd (palladium) and Au (gold) to Ag, or forming the electrode into a structure that prevents the sulfide gas from reaching the electrode have been taken.

However, even when such measures against sulfidation are taken for the electronic component, in the case where the electronic component is exposed to sulfide gas for a long time or exposed to high-concentration sulfide gas, disconnection cannot be prevented completely. Accordingly, it is necessary to detect the disconnection in advance to prevent failure from occurring at an unexpected timing.

With this regard, as described in Patent Literature 1, there has been proposed a sulfidation detection sensor capable of detecting a level of cumulative sulfide in an electronic component to detect a risk of failure such as disconnection which occurs in the electronic component due to sulfidation.

Patent Literature 1 discloses a sulfidation detection sensor configured such that a sulfidation detection body mainly made of Ag is provided on an insulation substrate, a transparent protective film having sulfide gas permeability is provided so as to cover the sulfidation detection body, and end face electrodes connected to the sulfidation detection body are provided, respectively, at both side end portions of the insulation substrate. When the sulfidation detection sensor configured as above is mounted on a circuit board together with other electronic components and then the circuit board is used in an atmosphere containing sulfide gas, the other electronic components get sulfurized over time, and the sulfide gas passes through the protective film of the sulfidation detection sensor and comes into contact with the sulfidation detection body, whereby decreasing the volume of silver forming the sulfidation detection body in accordance with the concentration of the sulfide gas and the elapsed time. Accordingly, by detecting change in the resistance values and disconnection in the sulfidation detection body, it is possible to detect the level of sulfidation.

Patent Literature 1 further discloses a sulfidation detection sensor in which a sulfidation detection body is exposed to the outside without being covered with a protective film so that the sulfidation detection body can detect sulfidation with high sensitivity. In a method of manufacturing the sulfidation detection sensor configured as above, as illustrated in FIG. 14A, a large-sized substrate 100 from which multi-piece insulation substrates are obtained is prepared, and a sulfidation detection body 101 is formed on a front surface of the large-sized substrate 100. After a pair of back electrodes 102 is formed on a back surface of the large-sized substrate 100, a protective film 103 made of a soluble material is formed on the center portion of the sulfidation detection body 101. Next, after the large-sized substrate 100 is primarily divided along primary slits to obtain strip-shaped substrates, end face electrodes 104 are formed at both end portions of each strip-shaped substrate by coating or vapor deposition. Then, after the strip-shaped substrate is secondarily divided along secondary slits to obtain chip substrates having the same size as that of the insulation substrate, external electrodes 105 which covers both end portions of the sulfidation detection body 101 and also covers the front surfaces of the end face electrodes 104 and those of the back electrodes 102 by sequentially performing Ni plating and Sn plating with respect to the chip substrates. Thereafter, the protective film 103 is removed by using a solvent or the like, whereby, as illustrated in FIG. 14B, it is possible to obtain the sulfidation detection sensor configured such that the sulfidation detection body 101 whose center portion is exposed is formed on the insulation substrate 100A.

CITATION LIST

Patent Literature

Patent Literature 1: JP-A-2009-250611

SUMMARY OF INVENTION

Technical Problem

According to Patent Literature 1, since the sulfidation detection sensor is mounted on a circuit board in a state where the sulfidation detection body 101 is exposed, the sensitivity to sulfidation is improved so that the sulfidation can be detected with high sensitivity. However, both the end portions of the protective film 103 formed by printing of resin paste have inclined surfaces, and thus plating materials of the external electrodes 105 are formed in close contact with the inclined surfaces of the protective film 103. Accordingly, as illustrated by the arrows P in FIG. 14B, the end portions of the external electrodes 105 after the protective film 103 is removed are pointed in angular shapes, which causes a problem that the external electrodes 105 are easily detached from the substrate.

The present invention has been made in view of the circumstances above of the prior art, and an object of the present invention is to provide a sulfidation detection sensor capable of detecting sulfidation with high sensitivity while preventing detachment of an external electrode.

Solution to Problem

In order to achieve the object above, the present invention provides a method of manufacturing a sulfidation detection sensor, comprising: a conductor forming step of forming a sulfidation detection conductor on a main surface of a large-sized substrate; a protective film forming step of forming a pair of first protective films made of an insoluble material on the sulfidation detection conductor, and forming a second protective film made of a soluble material so as to cover the sulfidation detection conductor positioned between the pair of first protective films; a primary dividing step of primarily dividing the large-sized substrate into strip-shaped substrates after the protective film forming step; an end face electrode forming step of forming end face electrodes on divided faces of each of the strip-shaped substrates, respectively; a secondary dividing step of secondarily dividing each of the strip-shaped substrates into a plurality of chip substrates after the end face electrode forming step; and an external electrode forming step of forming external electrodes on outer sides of the pair of first protective films, respectively, by performing electrolytic plating with respect to each of the chip substrates, wherein surface height of the second protective film is set to be lower than surface height of the first protective films.

According to the manufacturing method of the sulfidation detection sensor including the steps above, at the time of forming the external electrodes by plating with respect to each chip substrate obtained by secondarily dividing each strip-shaped substrate, a plating material adheres to an end portion of each first protective film but does not adhere to the second protective film. Accordingly, in a state of the product in which the second protective film is removed to expose the sulfidation detection portion of the sulfidation detection conductor, a pointed portion having an angular shape does not appear at an end portion of each external electrode, which is in close contact with the corresponding first protective film. As a result, it is possible to realize the sulfidation detection sensor with high sensitivity in which the sulfidation detection portion is exposed to the outside while preventing detachment of the external electrodes. Furthermore, since the surface height of the second protective film is set to be lower than the surface height of the first protective films, even in the case of forming the end face electrodes by sputtering from the end face sides of each strip-shaped substrate, the first protective films block the sputtering film and prevent the sputtering film from being formed on the second protective film. In addition, in the case of performing sputtering with respect to a plurality of vertically stacked strip-shaped substrates, it is possible to prevent the strip-shaped substrates from sticking to each other due to the adhesive force of the second protective film made of a soluble material.

As a further aspect, the method of manufacturing a sulfidation detection sensor described above further comprises: an internal electrode forming step of forming a pair of internal electrodes on the main surface of the large-sized substrate so as to be connected to both end portions of the sulfidation detection conductor, respectively, wherein the pair of first protective films is formed so as to cover overlapping portions in which the sulfidation detection conductor overlaps with each of the pair of internal electrodes. According to the aspect above, the pair of first protective films is formed on the overlapping portions, respectively, in which the sulfidation detection conductor overlaps with each of the pair of internal electrodes. As a result, it is possible to easily make the surface height of the first protective films higher than the surface height of the second protective film.

As a still further aspect, the method of manufacturing a sulfidation detection sensor described above further comprises: a resistor forming step of forming a pair of resistors on the main surface of the large-sized substrate so as to be connected to both end portions of the sulfidation detection conductor, respectively; an internal electrode forming step of forming a pair of internal electrodes that is connected to the pair of resistors, respectively; and a trimming step of forming trimming grooves on the pair of resistors to adjust resistance values, wherein each of the first protective films has an undercoat layer and an overcoat layer which cover corresponding one of the pair of resistors, and the pair of external electrodes is formed so as to cover the pair of internal electrodes, respectively. According to the aspect above, the pair of resistors and the pair of internal electrodes are arranged, respectively, in symmetrical positions interposing the second protective film on the center portion. As a result, it is possible to overlap a plurality of strip-shaped substrates in a stable posture.

As a still further aspect, the method of manufacturing a sulfidation detection sensor described above further comprises: an internal electrode forming step of forming an internal electrode on the main surface of the large-sized substrate so as to face one end portion of the sulfidation detection conductor with a certain space therebetween; a resistor forming step of forming a resistor that connects between the sulfidation detection conductor and the internal electrode; and a trimming step of forming a trimming groove on the resistor to adjust a resistance value, wherein one of the first protective films has an undercoat layer and an overcoat layer which cover the resistor while the other one of the first protective films is formed on the sulfidation detection conductor. According to the aspect above, at the time of providing a trimming groove for adjustment of the resistance value of the resistor, trimming can be performed while bringing probes into contact with the sulfidation detection conductor, which is positioned on the outer side of the other one of the first protective films, and the internal electrode, which is connected to the resistor. As a result, it is possible to prevent the sulfidation detection portion of the sulfidation detection conductor from being damaged by the probes.

Advantageous Effects of Invention

According to a method of manufacturing a sulfidation detection sensor of the present invention, it is possible to detect sulfidation with high sensitivity by exposing a sulfidation detection portion of a sulfidation detection conductor while preventing detachment of an external electrode.

BRIEF DESCRIPTION OF DRAWINGS

Each

Each

Each

Each

Each

Each

DESCRIPTION OF EMBODIMENTS

Figure 1:
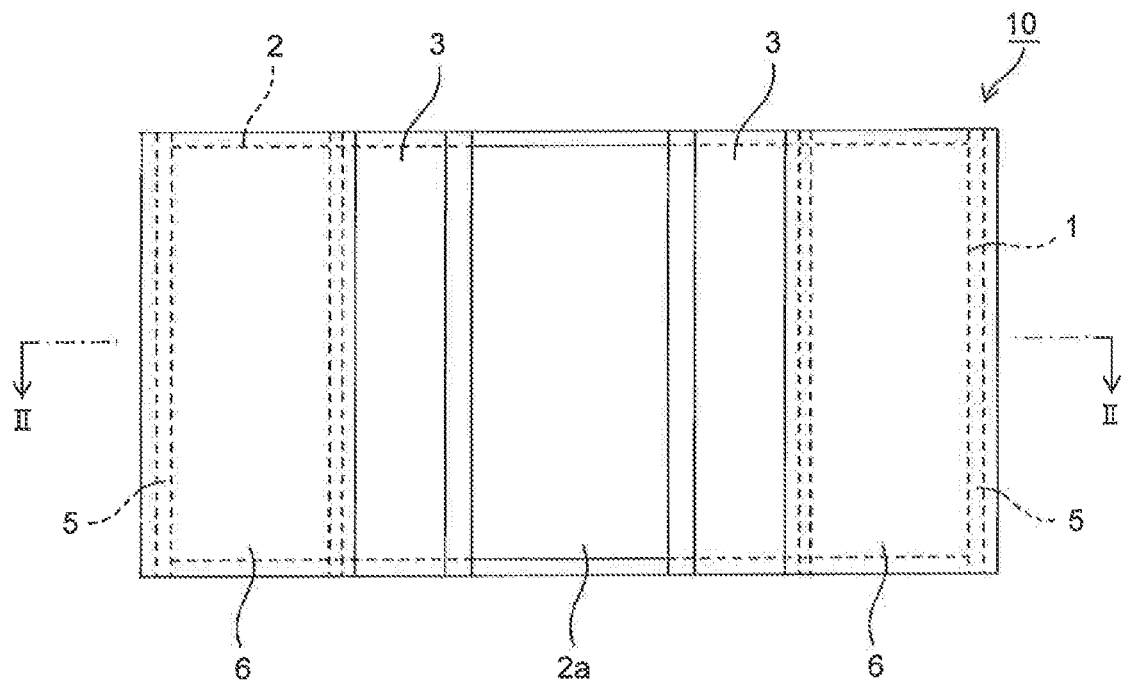
FIG. 1 is a plan view of a sulfurization detection sensor according to a first embodiment of the present invention.
Figure 2:
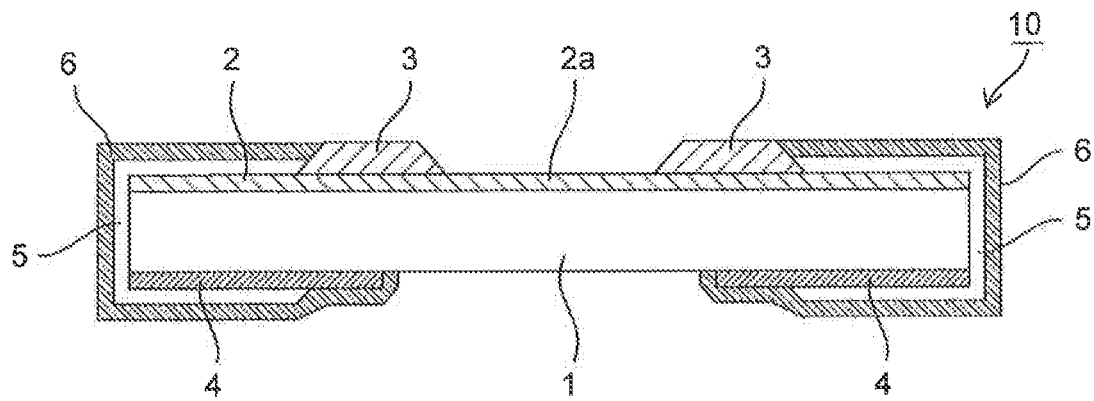
FIG. 2 is a cross-sectional view taken along the line II-II of FIG. 1.

Hereinafter, embodiments of the present invention will be described with reference to the drawings. FIG. 1 is a plan view of a sulfidation detection sensor according to a first embodiment of the present invention. FIG. 2 is a cross-sectional view taken along the line II-II of FIG. 1.

As illustrated in FIG. 1 and FIG. 2, a sulfidation detection sensor 10 according to the first embodiment mainly includes a rectangular parallelepiped insulation substrate 1, a sulfidation detection conductor 2 provided on a front surface of the insulation substrate 1, a pair of first protective films 3 provided on the sulfidation detection conductor 2 with a certain space therebetween, a pair of back electrodes 4 provided on a back surface of the insulation substrate 1 at both end portions in the longitudinal direction thereof, respectively, a pair of end face electrodes 5 provided on the insulation substrate 1 at both the end portions in the longitudinal direction thereof, respectively, and a pair of external electrodes 6 provided on front surfaces of the end face electrodes 5 and those of the back electrodes 4, respectively.

The sulfidation detection conductor 2 is obtained by scree-printing, drying, and firing Ag-based paste that contains silver as a main component. The sulfidation detection conductor 2 is formed so as to cover the front surface of the insulation substrate 1.

The pair of first protective films 3 is made of an insoluble material having a property that is insoluble in a solvent used in the subsequent second protective film removing step, and is obtained by screen-printing, curing, and heating epoxy-based resin paste. The first protective films 3 are formed at two positions, respectively, which are separated from each other across the center portion of the sulfidation detection conductor 2. As will be described later, the center portion of the sulfidation detection conductor 2 interposed between the pair of first protective films 3 serves as a sulfidation detection portion 2a.

The pair of back electrodes 4 is obtained by screen-printing, drying, and firing Ag-based paste that contains silver as a main component. The back electrodes 4 may be formed in a step different from the step of forming the sulfidation detection conductor 2, whereas they may be formed at the same time.

The pair of end face electrodes 5 is obtained by sputtering Ni/Cr or applying Ag-based paste on both end faces of the insulation substrate 1 and then heating and curing the paste. The pair of end face electrodes 5 is formed in the shape having a U-shaped cross section.

The pair of external electrodes 6 is composed of a double layer structure having a barrier layer and an external connection layer. The barrier layer is a Ni plating layer formed by electrolytic plating while the external connection layer is an Sn plating layer formed by electrolytic plating. Each of the external electrodes 6 covers the front surface of corresponding one of the back electrodes 4 which is exposed from corresponding one of the end face electrodes 5, and also covers the entire surface of the corresponding one of the end face electrodes 5.

Next, a manufacturing process of the sulfidation detection sensor 10 will be described with reference to FIG. 3 and FIG. 4. Each FIG. 3A to FIG. 3H is a plan view illustrating a surface of a large-sized substrate used in the manufacturing process. Each FIG. 4A to FIG. 4H is a cross-sectional view of one of the chips within the large-sized substrate, which is taken along a center portion of the large-sized substrate in the longitudinal direction thereof.

Figure 3A:
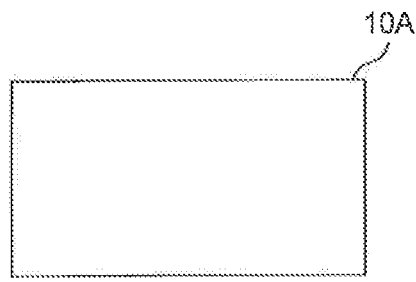
FIG. 3A~3H is a plan view illustrating a manufacturing process of the sulfurization detection sensor according to the first embodiment.
Figure 3B:
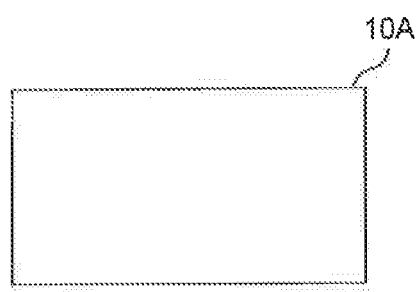
Figure 3C:
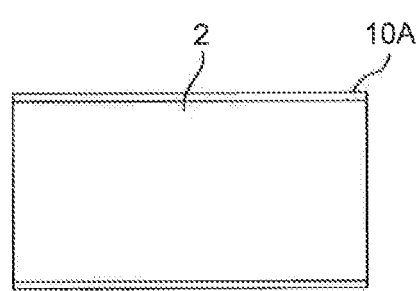
Figure 3D:
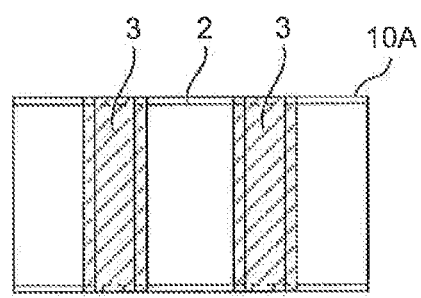
Figure 3E:
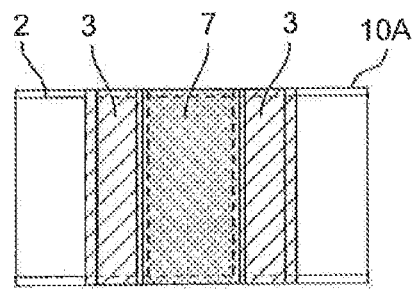
Figure 3F:
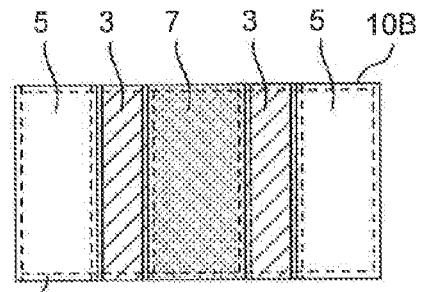
Figure 3G:
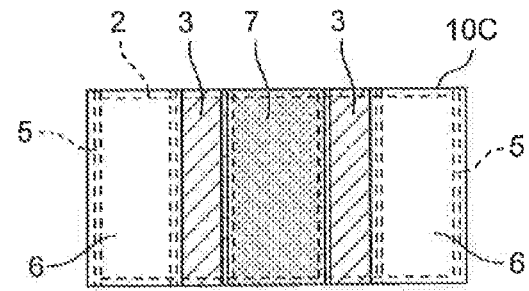
Figure 3H:
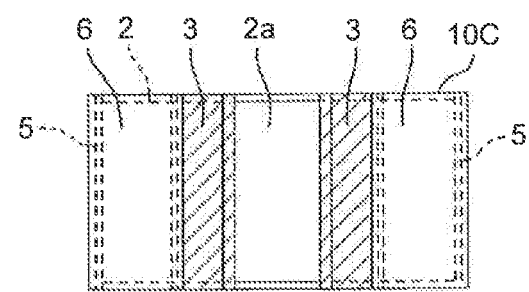
Figure 4A:
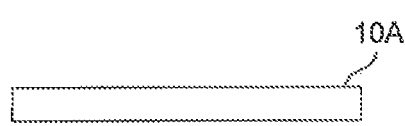
FIG. 4A~4H is a cross-sectional view illustrating the manufacturing process of the sulfurization detection sensor according to the first embodiment.

As illustrated in FIG. 3A and FIG. 4A, the first step of the manufacturing process of the sulfidation detection sensor 10 is to prepare a large-sized substrate 10A from which multi-piece insulation substrates 1 are obtained. In the large-sized substrate 10A, primary division grooves and secondary division grooves are provided in advance to form a grid pattern, and each one of the grids divided by the primary division grooves and the secondary division grooves serves as a single chip region. FIG. 3 illustrates the large-sized substrate 10A corresponding to a single chip region as a representative, but practically, each step described below is collectively performed with respect to the large-sized substrate corresponding to multi-piece chip regions.

Figure 4E:
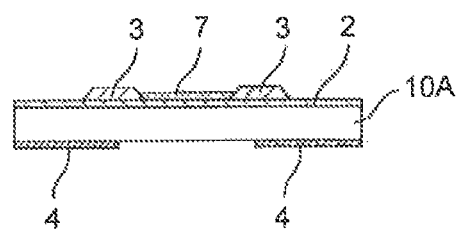
Figure 4B:
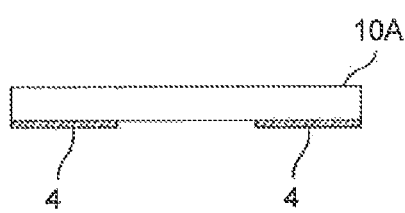

That is, as illustrated in FIG. 3B and FIG. 4B, after screen-printing Ag-based paste (Ag—Pd 20%) on a back surface of the large-sized substrate 10A, by drying and firing the screen-printed paste, the step of forming the pair of back electrodes 4 (back electrode forming step) is performed.

Figure 4F:
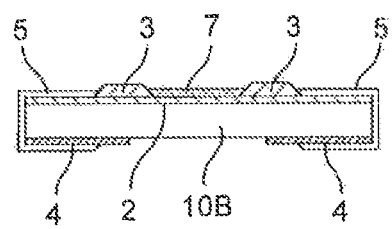
Figure 4C:
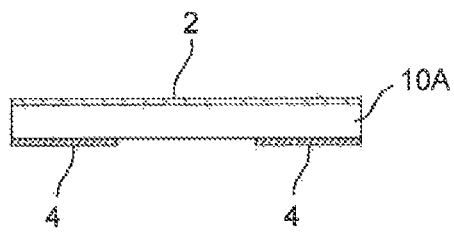

Next, after screen-printing Ag-based paste containing Ag as a main component on a front surface of the large-sized substrate 10A, by drying and firing the screen-printed paste, as illustrated in FIG. 3C and FIG. 4C, the step of forming the sulfidation detection conductor 2 extending longitudinally on the front surface of the large-sized substrate 10A (conductor forming step) is performed. In this connection, note that the order of formation of the back electrodes 4 and that of the sulfidation detection conductor 2 may be reversed, or performed at the same time.

Figure 4G:
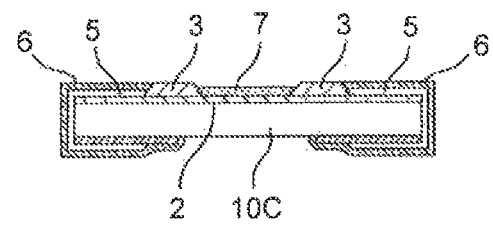
Figure 4D:
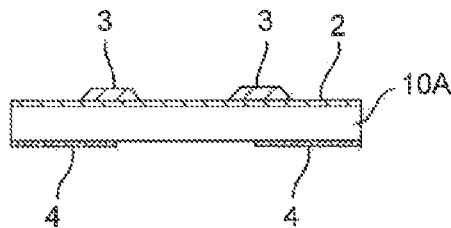

Next, after screen-printing epoxy-based resin paste on a front surface of the sulfidation detection conductor 2, by heating and curing the screen-printed paste, as illustrated in FIG. 3D and FIG. 4D, the step of forming the pair of first protective films 3 made of an insoluble material on two positions, respectively, near the center portion of the sulfidation detection conductor 2 is performed (first protective film forming step). The first protective films 3 may have a single layer structure, whereas a multi-layer structure having two or more layers realizes the first protective films 3 whose film thickness is large.

Next, after screen-printing soluble resin paste such as phenol resin on the sulfidation detection conductor 2 so as to cover an exposed portion of the sulfidation detection conductor 2 interposed between the pair of first protective films 3, by heating and curing the screen-printed paste, as illustrated in FIG. 3E and FIG. 4E, the step of forming the second protective film 7 which covers the sulfidation detection conductor 2 between the pair of first protective films 3 (second protective film forming step) is performed. The second protective film 7 is made of a soluble material having a property that is soluble in a solvent but is insoluble in plating solution to be used in the subsequent external electrode forming step. The second protective film 7 is formed such that the surface height thereof is lower than the surface height of the first protective films 3. In this connection, it is preferable to form the second protective film 7 by using a material having viscosity lower than that of the first protective films 3 so as to easily make the film thickness thereof small.

Next, after primarily dividing the large-sized substrate 10A along the primary division grooves to obtain strip-shaped substrates 10B (primary dividing step), by sputtering Ni/Cr on divided faces of each strip-shaped substrate 10B, as illustrated in FIG. 3F and FIG. 4F, the step of forming the pair of end face electrodes 5 on the divided faces of each strip-shaped substrate 10B, respectively, each of which covers one of both the end portions of the sulfidation detection conductor 2 in the longitudinal direction thereof and also covers most of corresponding one of the back electrodes 4 (end face electrode forming step) is performed. The sputtering above is performed with respect to the plurality of vertically stacked strip-shaped substrates 10B. At the time of sputtering, since the first protective films 3 protrude upward more than the second protective film 7, the pair of first protective films 3 provided on an arbitrary one of the strip-shaped substrates 10B comes into contact with the lower surface of another one of the strip-shaped substrates 10B arranged on the upper side. As a result, the first protective film 3 can block the sputtering film and prevent the sputtering film from reaching the second protective film 7, and even in the case where the second protective film 7 is cured at a low temperature or the like so as to be easily removed in a later step and thus gets adhesive force, it is possible to prevent the vertically stacked strip-shaped substrates 10B from sticking to each other due to the adhesive force of the second protective film 7. In this connection, instead of sputtering Ni/Cr on the divided faces of each strip-shaped substrate 10B, Ag-based paste may be applied thereto, heated, and cured to form the end face electrodes 5.

Next, after secondarily dividing the strip-shaped substrates 10B along the secondary division grooves to obtain a plurality of chip-shaped substrates 10C (secondary dividing step), by performing electrolytic plating with respect to each chip-shaped substrate 10C to form a Ni—Sn plating layer, as illustrated in FIG. 3G and FIG. 4G, the step of forming the pair of external electrodes 6 which covers the entire surfaces of the end face electrodes 5 and also covers exposed portions of the back electrodes 4 (external electrode forming step) is performed.

Figure 4H:
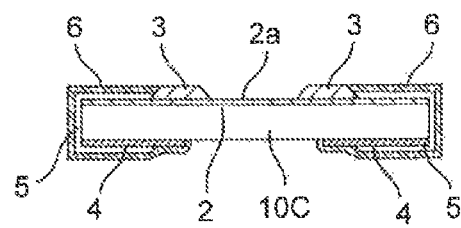

Next, by immersing each chip-shaped substrate 10C in an alkaline solution or the like which dissolves the second protective film 7 but does not dissolve the first protective films 3 to remove the second protective film 7, as illustrated in FIG. 3H and FIG. 4H, the step of exposing the sulfidation detection portion 2a of the sulfidation detection conductor 2 between the pair of first protective films 3 (second protective film removing step) is performed. In this way, the manufacturing process of the sulfidation detection sensor 10 illustrated in FIG. 1 and FIG. 2 is completed. In this connection, note that the second protective film removing step can be performed after mounting the sulfidation detection sensor 10 on a circuit board. In this case, the sulfidation detection portion 2a can be protected until being mounted on the circuit board.

As described above, in the method of manufacturing the sulfidation detection sensor 10 according to the first embodiment, at the time of forming the external electrodes 6 by plating with respect to each chip-shaped substrate 10C which has been obtained by the secondary dividing step of dividing the strip-shaped substrates 10B, plating materials of the external electrodes 6 do not adhere to the second protective film 7. Accordingly, even in the case of exposing the sulfidation detection unit 2a to the outside by removing the second protective film 7, angular shaped pointed portions do not appear at end portions of the external electrodes 6, which are in close contact with the first protective films 3, respectively. As a result, it is possible to realize the sulfidation detection sensor 10 with high sensitivity in which the sulfidation detection portion 2a is exposed to the outside while preventing detachment of the external electrodes 6. Furthermore, since the surface height of the second protective film 7 is set to be lower than the surface height of the first protective films 3, even in the case of forming the end face electrodes 5 by sputtering from the end face sides of the strip-shaped substrate 10B, the first protective films 3 can block the sputtering film and prevent the sputtering film from being formed on the second protective film 7. Still further, since the surface height of the second protective film 7 is set to be lower than the surface height of the first protective films 3, at the time of performing sputtering with respect to the vertically stacked strip-shaped substrates 10B, it is possible to prevent the strip-shaped substrates 10B from sticking to each other due to the adhesive force of the second protective film 7 made of a soluble material.

Figure 5:
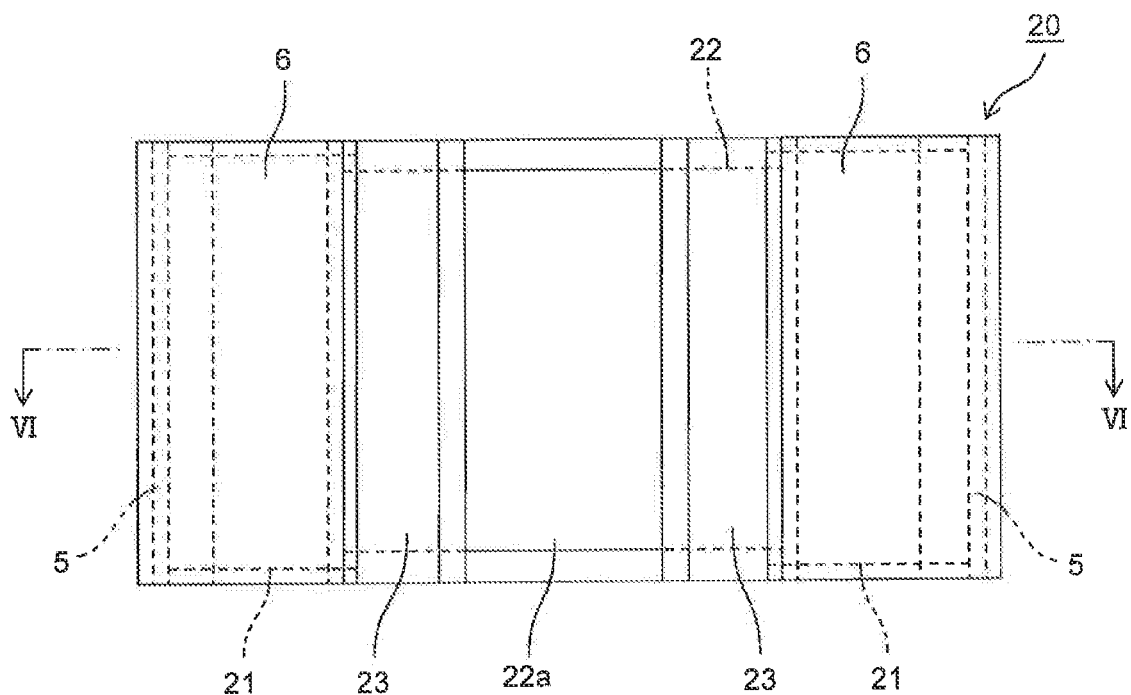
FIG. 5 is a plan view of a sulfurization detection sensor according to a second embodiment of the present invention.
Figure 6:
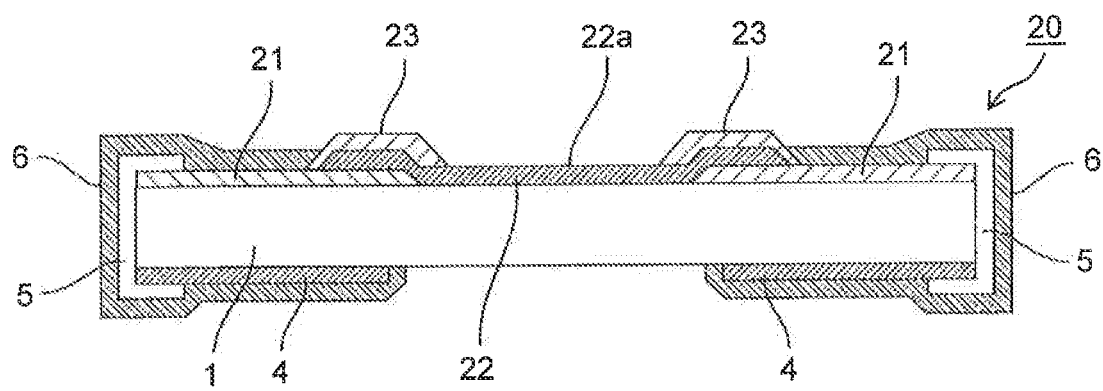
FIG. 6 is a cross-sectional view taken along the line VI-VI of FIG. 5.

FIG. 5 is a plan view of a sulfidation detection sensor 20 according to a second embodiment of the present invention. FIG. 6 is a cross-sectional view taken along the line VI-VI of FIG. 5. In the following, portions corresponding to those illustrated in FIG. 1 and FIG. 2 are provided with the same reference signs, and repetitive explanation therefor will be omitted.

As illustrated in FIG. 5 and FIG. 6, in the sulfidation detection sensor 20 according to the second embodiment, a pair of internal electrodes 21 is formed on the front surface of the insulation substrate 1 at both end portions in the longitudinal direction thereof, respectively, and a sulfidation detection conductor 22 is connected to the pair of internal electrodes 21 such that both end portions of the sulfidation detection conductor 22 overlap with the pair of internal electrodes 21, respectively. A pair of first protective films 23 is formed so as to cover the overlapping portions, respectively, in which the sulfidation detection conductor 22 overlaps with each of the pair of internal electrodes 21, and a sulfidation detection portion 22a of the sulfidation detection conductor 22 is exposed between the first protective films 23. The other configurations are basically the same as those of the sulfidation detection sensor 10 according to the first embodiment.

Figure 7A:
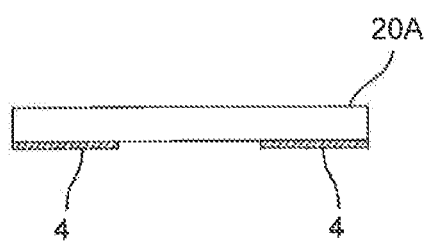
FIG. 7A~7H is a cross-sectional view illustrating a manufacturing process of the sulfurization detection sensor according to the second embodiment.

In the following, a manufacturing process of the sulfidation detection sensor 20 configured as above will be described with reference to the cross-sectional view of FIG. 7. Firstly, as illustrated in FIG. 7A, after screen-printing Ag-based paste (Ag—Pd 20%) on a back surface of a large-sized substrate 20A, by drying and firing the screen-printed paste, the step of forming the pair of back electrodes 4 facing each other with a certain space therebetween (back electrode forming step) is performed. At the same time, or before or after this step, after screen-printing Ag-based paste (Ag—Pd 20%) on a front surface of the large-sized substrate 20A, by drying and firing the screen-printed paste, as illustrated in FIG. 7B, the step of forming the pair of internal electrodes 21 facing each other with a certain space therebetween (internal electrode forming step) is performed.

Figure 7E:
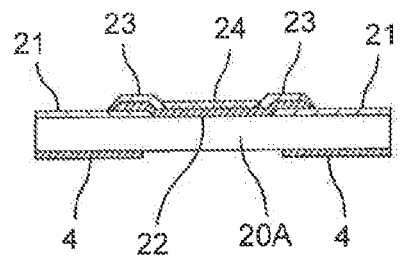
Figure 7B:
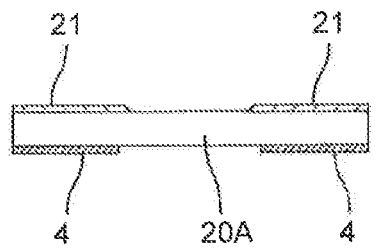
Figure 7F:
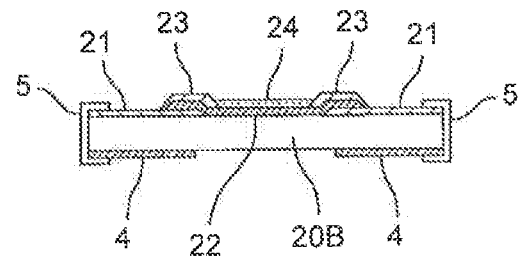
Figure 7C:
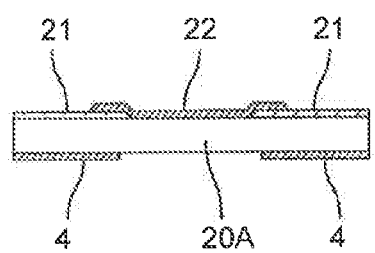

Next, after screen-printing Ag-based paste on the front surface of the large-sized substrate 20A, by drying and firing the screen-printed paste, as illustrated in FIG. 7C, the step of forming the sulfidation detection conductor 22 connected to the pair of internal electrodes 21 (conductor forming step) is performed. Since the sulfidation detection conductor 22 and the pair of internal electrodes 21 are connected such that their end portions overlap with each other, each of the overlapped portions is composed of a double layer structure having large film thickness.

Figure 7G:
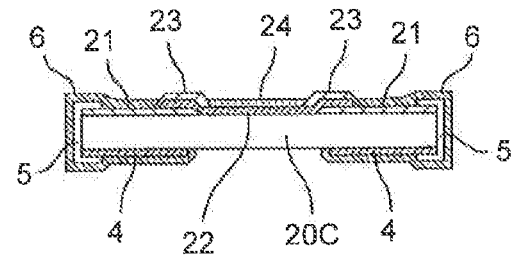
Figure 7D:
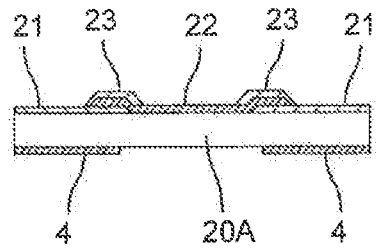

Next, after screen-printing epoxy-based resin paste so as to cover the overlapped portions, in which the sulfidation detection conductor 22 overlaps with each of the pair of internal electrodes 21, by heating and curing the screen-printed paste, as illustrated in FIG. 7D, the step of forming the pair of first protective films 23 made of an insoluble material on both the end portions of the sulfidation detection conductor 22, respectively, (first protective film forming step) is performed.

Next, after screen-printing soluble resin paste such as phenol resin on the front surface of the sulfidation detection conductor 22 interposed between the pair of first protective films 23, by heating and curing the screen-printed paste, as illustrated in FIG. 7E, the step of forming the second protective film 24 which covers the sulfidation detection conductor 22 between the pair of first protective films 23 (second protective film forming step) is performed. The second protective film 24 is made of a soluble material having a property that is soluble in a solvent but is insoluble in plating solution to be used in the subsequent external electrode forming step. The second protective film 24 is formed such that the surface height thereof is lower than the surface height of the first protective films 23.

Next, after primarily dividing the large-sized substrate 20A along the primary division grooves to obtain strip-shaped substrates 20B (primary dividing step), by applying Ag-based paste on divided faces of each strip-shaped substrate 20B and then heating and curing the applied paste, as illustrated in FIG. 7F, the step of forming the pair of end face electrodes 5 on divided faces of each strip-shaped substrate 20B, respectively, each of which connects corresponding ones of the internal electrodes 21 and the back electrodes 4 (end face electrode forming step) is performed. In this connection, instead of applying Ag-based paste to form the end face electrodes 5, in the same manner as the first embodiment described above, the end face electrodes 5 may be formed by sputtering Ni/Cr on the divided faces of each strip-shaped substrate 20B.

Next, after secondarily dividing the strip-shaped substrates 20B along the secondary division grooves to obtain a plurality of chip-shaped substrates 20C (secondary dividing step), by performing electrolytic plating with respect to each chip-shaped substrate 20C to form a Ni—Sn plating layer, as illustrated in FIG. 7G, the step of forming the pair of external electrodes 6 which covers the entire surfaces of the end face electrodes 5 and also covers exposed portions of the internal electrodes 21 and those of the back electrodes 4 (external electrode forming step) is performed.

Figure 7H:
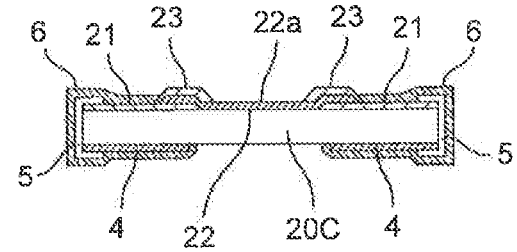

Next, by immersing each chip-shaped substrate 20C in an alkaline solution or the like which dissolves the second protective film 24 but does not dissolve the first protective films 23 to remove the second protective film 24, as illustrated in FIG. 7H, the step of exposing the sulfidation detection portion 22a of the sulfidation detection conductor 22 between the pair of first protective films 23 (second protective film removing step) is performed. In this way, the manufacturing process of the sulfidation detection sensor 20 illustrated in FIG. 5 and FIG. 6 is completed. In this connection, note that the second protective film removing step can be performed after mounting the sulfidation detection sensor 20 on a circuit board. In this case, the sulfidation detection portion 22a can be protected until being mounted on the circuit board.

As described above, in the manufacturing method of the sulfidation detection sensor 20 according to the second embodiment, after forming the pair of internal electrodes 21 connected to both the end portions of the sulfidation detection conductor 22, respectively, on the front surface of the large-sized substrate 20A, the step of forming the first protective films 23 on the overlapped portions in which the sulfidation detection conductor 22 overlaps with each of the pair of internal electrodes 21 is performed. As a result, in addition to the effects that can be obtained by the first embodiment, the second embodiment can obtain an advantageous effect that the surface height of the first protective films 23 can be easily set to be higher than the surface height of the second protective film 24.

Figure 8:
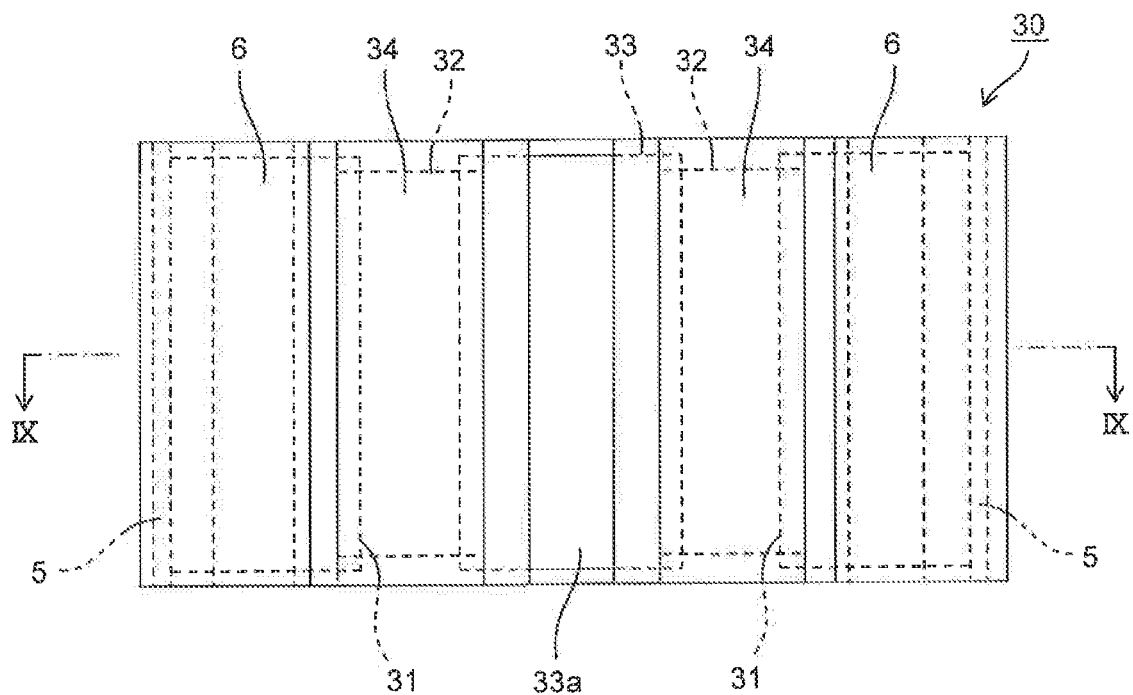
FIG. 8 is a plan view of a sulfurization detection sensor according to a third embodiment of the present invention.
Figure 9:
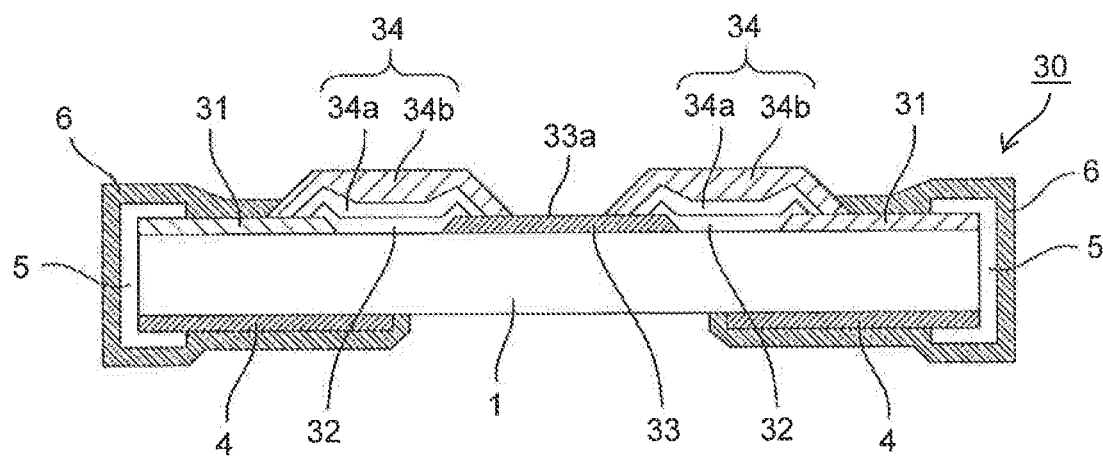
FIG. 9 is a cross-sectional view taken along the line IX-IX of FIG. 8.

FIG. 8 is a plan view of a sulfidation detection sensor 30 according to a third embodiment of the present invention. FIG. 9 is a cross-sectional view taken along the line IX-IX of FIG. 8. In the following, portions corresponding to those illustrated in FIG. 1 and FIG. 2 are provided with the same reference signs, and repetitive explanation therefor will be omitted.

As illustrated in FIG. 8 and FIG. 9, in the sulfidation detection sensor 30 according to the third embodiment, a pair of internal electrodes 31 is formed on the front surface of the insulation substrate 1 at both end portions in the longitudinal direction thereof, respectively, and a pair of resistors 32 is connected to a sulfidation detection conductor 33 in series between the internal electrodes 31. The resistors 32 are covered with first protective films 34, respectively, each of which is composed of a double layer structure having an undercoat layer 34a and an overcoat layer 34b, and a sulfidation detection portion 33a of the sulfidation detection conductor 33 is exposed between the first protective films 34. The other configurations are basically the same as those of the sulfidation detection sensor 10 according to the first embodiment.

Figure 10A:
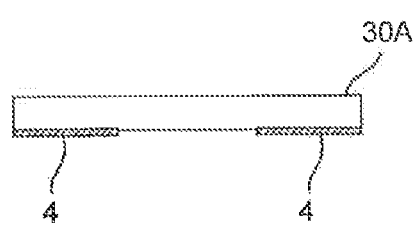
FIG. 10A~10H is a cross-sectional view illustrating a manufacturing process of the sulfurization detection sensor according to the third embodiment.

In the following, a manufacturing process of the sulfidation detection sensor 30 configured as above will be described with reference to the cross-sectional view of FIG. 10. Firstly, as illustrated in FIG. 10A, after screen-printing Ag-based paste on a back surface of a large-sized substrate 30A, by drying and firing the screen-printed paste, the step of forming the pair of back electrodes 4 facing each other with a certain space therebetween (back electrode forming step) is performed.

Figure 10E:
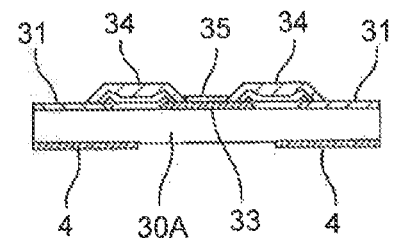
Figure 10B:
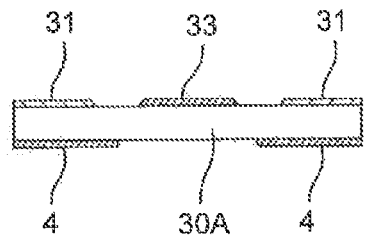

Next, after screen-printing Ag-based paste containing Ag as a main component on a front surface of the large-sized substrate 30A, by drying and firing the screen-printed paste, as illustrated in FIG. 10B, the step of forming the sulfidation detection conductor 33 and the pair of internal electrodes 31 with certain spaces therebetween (conductor forming step and internal electrode forming step) is performed. In this way, by forming the sulfidation detection conductor 33 and the pair of internal electrodes 31 at the same time by using the same material, spaces between the sulfidation detection conductor 33 and each of the pair of internal electrodes 31 can be formed without variation.

Figure 10F:
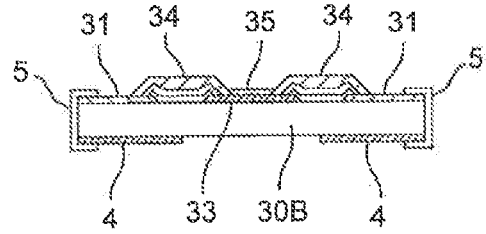
Figure 10C:
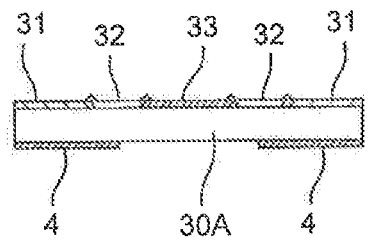

Next, after screen-printing resistor paste such as ruthenium oxide on the front surface of the large-sized substrate 30A, by drying and firing the screen-printed paste, as illustrated in FIG. 10C, the step of forming the pair of resistors 32 such that both ends thereof are connected to the sulfidation detection conductor 33 and each of the internal electrodes 31, respectively (resistor forming step) is performed.

Next, after screen-printing glass paste so as to cover the resistors 32 and then drying and firing the screen-printed paste to form the undercoat layers 34a, the step of forming trimming grooves (not illustrated) for adjustment of resistance values from above the undercoat layers 34a (trimming step) is performed. Thereafter, by screen-printing epoxy-based resin paste so as to cover the undercoat layers 34a and then heating and curing the screen-printed paste, as illustrated in FIG. 10D, the step of forming the pair of first protective films 34, which is composed of the double layer structure having the undercoat layer 34a and the overcoat layer 34b, at both end portions of the sulfidation detection conductor 33, respectively, (first protective film forming step) is performed.

Next, after screen-printing soluble resin paste such as phenol resin on the front surface of the sulfidation detection conductor 33, by heating and curing the screen-printed paste, as illustrated in FIG. 10E, the step of forming the second protective film 35 which covers the sulfidation detection conductor 33 between the pair of first protective films 34 (second protective film forming step) is performed. The second protective film 35 is made of a soluble material having a property that is soluble in a solvent but is insoluble in plating solution to be used in the subsequent external electrode forming step. The second protective film 35 is formed such that the surface height thereof is lower than the surface height of the first protective films 34.

Next, after primarily dividing the large-sized substrate 30A along the primary division grooves to obtain strip-shaped substrates 30B (primary dividing step), by applying Ag-based paste on divided faces of each strip-shaped substrate 30B and then heating and curing the applied paste, as illustrated in FIG. 10F, the step of forming the pair of end face electrodes 5 on divided faces of each strip-shaped substrate 30B, respectively, each of which connects corresponding ones of the internal electrodes 31 and the back electrodes 4 (end face electrode forming step) is performed. In this connection, instead of applying Ag-based paste to form the end face electrodes 5, in the same manner as the first embodiment described above, the end face electrodes 5 may be formed by sputtering Ni/Cr on the divided faces of each strip-shaped substrate 30B.

Figure 10G:
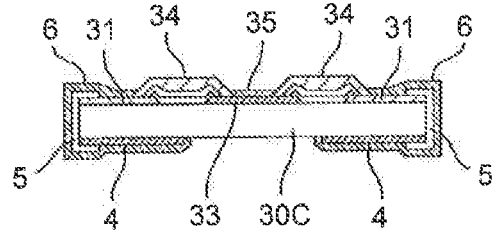
Figure 10D:
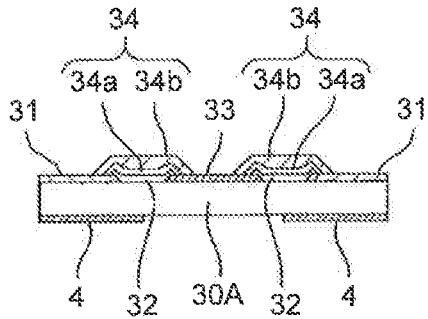

Next, after secondarily dividing the strip-shaped substrates 30B along the secondary division grooves to obtain a plurality of chip-shaped substrates 30C (secondary dividing step), by performing electrolytic plating with respect to each chip-shaped substrate 30C to form a Ni—Sn plating layer, as illustrated in FIG. 10G, the step of forming the pair of external electrodes 6 which covers the entire surfaces of the end face electrodes 5 and also covers exposed portions of the internal electrodes 31 and those of the back electrodes 4 (external electrode forming step) is performed.

Figure 10H:
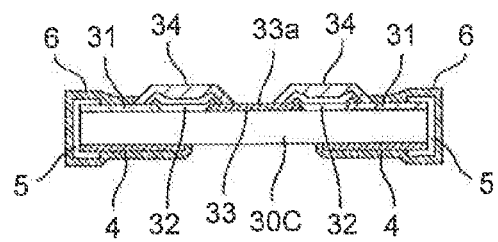

Next, by immersing each chip-shaped substrate 30C in an alkaline solution or the like which dissolves the second protective film 35 but does not dissolve the first protective films 34 to remove the second protective film 35, as illustrated in FIG. 10H, the step of exposing the sulfidation detection portion 33a of the sulfidation detection conductor 33 between the pair of first protective films 34 (second protective film removing step) is performed. In this way, the manufacturing process of the sulfidation detection sensor 30 illustrated in FIG. 8 and FIG. 9 is completed. In this connection, note that the second protective film removing step can be performed after mounting the sulfidation detection sensor 30 on a circuit board. In this case, the sulfidation detection portion 33a can be protected until being mounted on the circuit board.

As described above, in the manufacturing method of the sulfidation detection sensor 30 according to the third embodiment, after forming the pair of resistors 32 and the pair of internal electrodes 31 which are connected, respectively, in series on both sides across the sulfidation detection conductor 33 positioned at the center portion, the step of forming the pair of first protective films 34, which is composed of the double layer structure having the undercoat layer 34a and the overcoat layer 34b, at the positions covering the resistors 32, respectively, is performed. As a result, in addition to the effects that can be obtained by the first embodiment, the third embodiment can make it possible to easily make the surface height of the first protective films 34 higher than the surface height of the second protective film 35, use the sulfidation detection sensor 30 as a sulfidation detection sensor equipped with a chip resistor, and manufacture the sulfidation detection sensor 30 by the same process as that of a general chip resistor.

Figure 11:
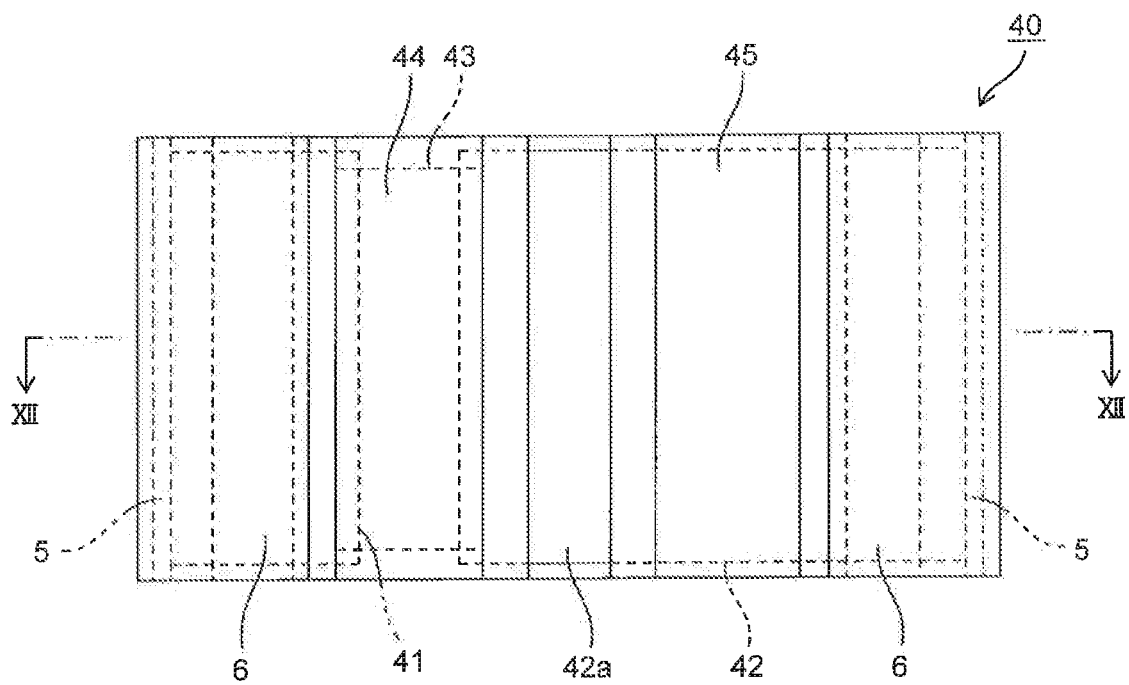
FIG. 11 is a plan view of a sulfurization detection sensor according to a fourth embodiment of the present invention.
Figure 12:
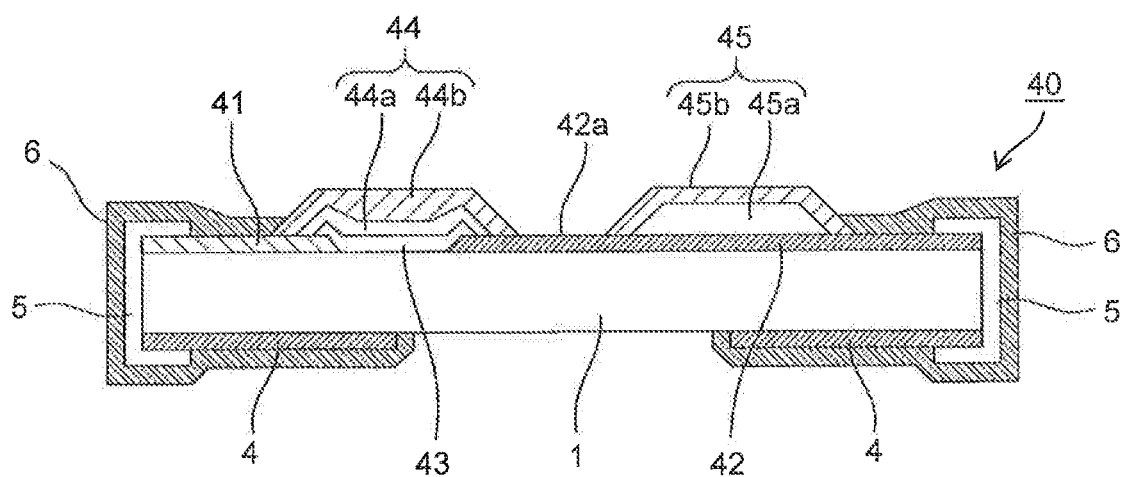
FIG. 12 is a cross-sectional view taken along the line XII-XII of FIG. 11.

FIG. 11 is a plan view of a sulfidation detection sensor 40 according to a fourth embodiment of the present invention. FIG. 12 is a cross-sectional view taken along the line XII-XII of FIG. 11. In the following, portions corresponding to those illustrated in FIG. 1 and FIG. 2 are provided with the same reference signs, and repetitive explanation therefor will be omitted As illustrated in FIG. 11 and FIG. 12, in the sulfidation detection sensor 40 according to the fourth embodiment, an internal electrode 41 and a sulfidation detection conductor 42 are formed with a certain space therebetween on a front surface of the insulation substrate 1 at both end portions in the longitudinal direction thereof, respectively, and a resistor 43 is formed between the internal electrode 41 and the sulfidation detection conductor 42. The resistor 43 is covered with a first protective film 44 that is composed of a double layer structure having an undercoat layer 44a and an overcoat layer 44b, and a trimming groove (not illustrated) for adjustment of a resistance value is formed on the resistor 43 and the undercoat layer 44a. In addition, another first protective film 45 that is composed of a double layer structure having an undercoat layer 45a and an overcoat layer 45b is formed on the center portion of the sulfidation detection conductor 42, and a sulfidation detection portion 42a is exposed between the first protective film 45 and the first protective film 44 that is positioned on the resistor 43. The other configurations are basically the same as those of the sulfidation detection sensor 10 according to the first embodiment.

Figure 13A:
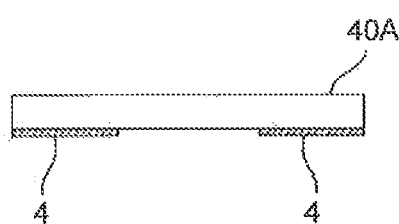
FIG. 13A~13H is a cross-sectional view illustrating a manufacturing process of the sulfurization detection sensor according to the fourth embodiment.

In the following, a manufacturing process of the sulfidation detection sensor 40 configured as above will be described with reference to the cross-sectional view of FIG. 13. Firstly, as illustrated in FIG. 13A, after screen-printing Ag-based paste on a back surface of a large-sized substrate 40A, by drying and firing the screen-printed paste, the step of forming the pair of back electrodes 4 facing each other with a certain space therebetween (back electrode forming step) is performed.

Figure 13B:
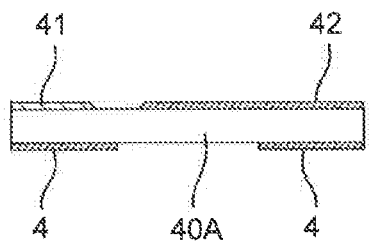

Next, after screen-printing Ag-based paste containing Ag as a main component on a front surface of the large-sized substrate 40A, by drying and firing the screen-printed paste, as illustrated in FIG. 13B, the step of forming the internal electrode 41 and the sulfidation detection conductor 42 on the front surface of the large-sized substrate 40A with a certain space therebetween (conductor forming step and internal electrode forming step) is performed.

Figure 13C:
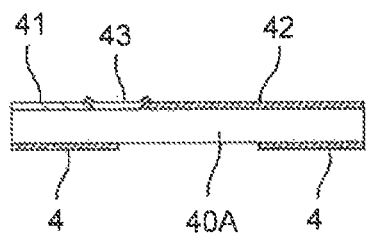

Next, after screen-printing resistor paste such as ruthenium oxide on the front surface of the large-sized substrate 40A, by drying and firing the screen-printed paste, as illustrated in FIG. 13C, the step of forming the resistor 43 whose both ends are connected to the internal electrode 41 and the sulfidation detection conductor 42, respectively, (resistor forming step) is performed.

Figure 13D:
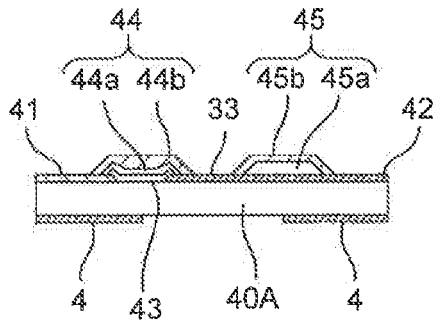

Next, after screen-printing glass paste on the position covering the resistors 43 and the center portion of the sulfidation detection conductor 42, and then drying and firing the screen-printed paste to form the pair of undercoat layers 44a, 45a, the step of forming a trimming groove (not illustrated) for adjustment of a resistance value from above the undercoat layer 44a which covers the resistor 43 (trimming step) is performed. At this time, by bringing a pair of probes into contact with the sulfidation detection conductor 42, which is located on the outer side of the undercoat layer 45a, and the internal electrode 41, trimming can be performed while measuring the resistance value of the resistor 43, whereby making it possible to prevent the portion of the sulfidation detection conductor 42 serving as the sulfidation detection portion 42a from being damaged by the probes. Thereafter, by screen-printing epoxy-based resin paste so as to cover both the undercoat layers 44a, 45a and then heating and curing the screen-printed paste, as illustrated in FIG. 13D, the step of forming the first protective film 44, which is composed of the undercoat layer 44a and the overcoat layer 44b, on the resistor 43 as well as the first protective film 45, which is composed of the undercoat layer 45a and the overcoat layer 45b, on the center portion of the sulfidation detection conductor 42 (first protective film forming step) is performed. In this connection, the pair of first protective films 44, 45 has the same configuration (double layer structure with a glass material and a resin material) so as to be formed at the same time. Meanwhile, since it is not necessary to provide a trimming groove on the first protective film 45 positioned on the sulfidation detection conductor 42, the first protective film 45 may be made of only a resin material such as epoxy resin. Furthermore, in the case of forming the first protective film 44 and the first protective film 45 at symmetrical positions of the front surface of the insulation substrate 1, it is possible to eliminate the directionality.

Figure 13E:
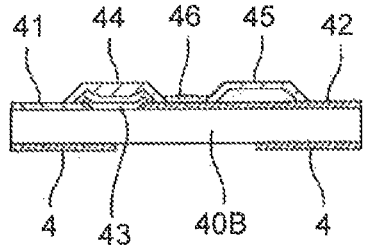

Next, after screen-printing soluble resin paste such as water-soluble phenol resin on the front surface of the sulfidation detection conductor 42, by heating and curing the screen-printed paste, as illustrated in FIG. 13E, the step of forming the second protective film 46 which covers the sulfidation detection conductor 42 between the pair of first protective films 44, 45 (second protective film forming step) is performed. The second protective film 46 is made of a soluble material having a property that is soluble in a solvent but is insoluble in plating solution to be used in the subsequent external electrode forming step. The second protective film 46 is formed such that the surface height thereof is lower than the surface height of the first protective films 44, 45.

Figure 13F:
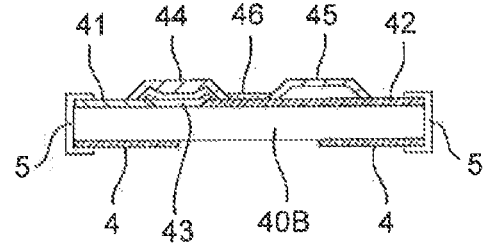

Next, after primarily dividing the large-sized substrate 40A along the primary division grooves to obtain strip-shaped substrates 40B (primary dividing step), by applying Ag-based paste on divided faces of each strip-shaped substrate 40B and then heating and curing the applied paste, as illustrated in FIG. 13F, the step of forming the pair of end face electrodes 5 on divided faces of each strip-shaped substrate 40B, respectively, each of which connects the internal electrodes 41 and the back electrodes 4 (end face electrode forming step) is performed. In this connection, instead of applying Ag-based paste to form the end face electrodes 5, in the same manner as the first embodiment described above, the end face electrodes 5 may be formed by sputtering Ni/Cr on the divided faces of each strip-shaped substrate 40B.

Figure 13G:
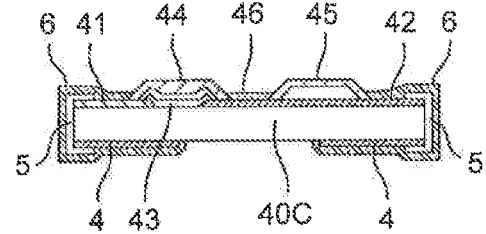

Next, after secondarily dividing the strip-shaped substrates 40B along the secondary division grooves to obtain a plurality of chip-shaped substrates 40C (secondary dividing step), by performing electrolytic plating with respect to each chip-shaped substrate 40C to form a Ni—Sn plating layer, as illustrated in FIG. 13G, the step of forming the pair of external electrodes 6 which covers the entire surfaces of the end face electrodes 5 and also covers exposed portions of the internal electrode 41 and those of the back electrodes 4 (external electrode forming step) is performed.

Figure 13H:
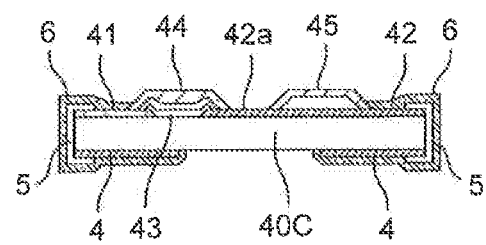
Figure 14A:
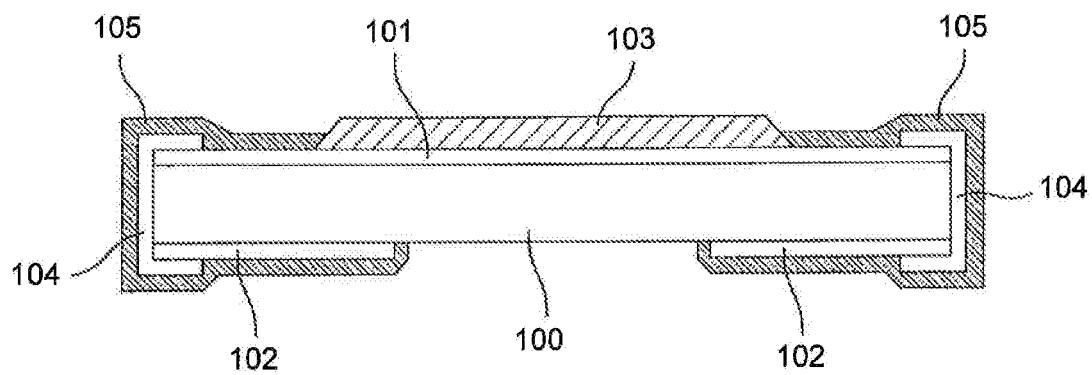
FIGS. 14A and 14B is a cross-sectional view illustrating a manufacturing process of the sulfurization detection sensor according to the prior art.
Figure 14B:
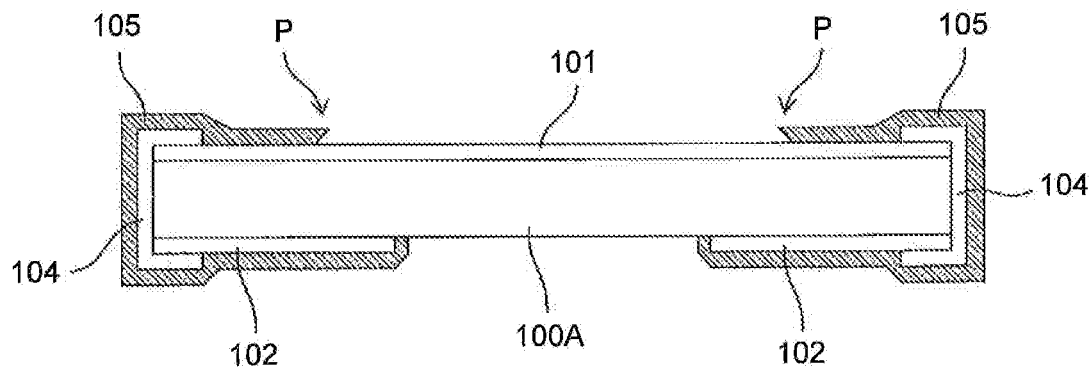

Next, by immersing each chip-shaped substrate 40C in an alkaline solution or the like which dissolves the second protective film 46 but does not dissolve the first protective films 44, 45 to remove the second protective film 46, as illustrated in FIG. 13H, the step of exposing the sulfidation detection portion 42a of the sulfidation detection conductor 42 between the pair of first protective films 44, 45 (second protective film removing step) is performed. In this way, the manufacturing process of the sulfidation detection sensor 40 illustrated in FIG. 11 and FIG. 12 is completed. In this connection, note that the second protective film removing step can be performed after mounting the sulfidation detection sensor 40 on a circuit board. In this case, the sulfidation detection portion 42a can be protected until being mounted on the circuit board.

As described above, in the manufacturing method of the sulfidation detection sensor 40 according to the fourth embodiment, after the resistor 43 that connects between the internal electrode 41 and the sulfidation detection conductor 42 is formed, the first protective film 44 is formed on the position covering the resistor 43 and the first protective film 45 is formed on the predetermined position of the sulfidation detection conductor 42, and then the sulfidation detection portion 42a is exposed between the first protective films 44, 45. Accordingly, the pair of probes can be brought into contact with the sulfidation detection conductor 42, which is positioned on the outer side of the undercoat layer 45a, and the internal electrode 41 at the time of providing a trimming groove to adjust the resistance value of the resistor 43. As a result, in addition to the effects that can be obtained by the first embodiment, the fourth embodiment can advantageously prevent the sulfidation detection portion 42a from being damaged by the probes.

REFERENCE SIGNS LIST 10, 20, 30, 40 sulfidation detection sensor
1 insulation substrate
2, 22, 33, 42 sulfidation detection conductor
2a, 22a, 33a, 42a sulfidation detection portion
3, 23 first protective film
back electrode
end face electrode
external electrode
7, 24, 35, 46 second protective film
21, 31, 41 internal electrode
23, 32, 43 resistor
34, 44, 45 first protective film
34a, 44a, 45a undercoat layer
34b, 44b, 45b overcoat layer
10A, 20A, 30A, 40A large-sized substrate
10B, 20B, 30B, 40B strip-shaped substrate
10C, 20C, 30C, 40C chip-shaped substrate

The invention claimed is:
1. A method of manufacturing a sulfidation detection sensor, comprising:
a conductor forming step of forming a sulfidation detection conductor on a main surface of a large-sized substrate;
a protective film forming step of forming a pair of first protective films on the sulfidation detection conductor, and forming a second protective film so as to cover the sulfidation detection conductor positioned between the pair of first protective films;

a primary dividing step of primarily dividing the large-sized substrate into strip-shaped substrates after the protective film forming step;

an end face electrode forming step of forming end face electrodes on divided faces of each of the strip-shaped substrates, respectively;

a secondary dividing step of secondarily dividing each of the strip-shaped substrates into a plurality of chip substrates after the end face electrode forming step; and an external electrode forming step of forming external electrodes on outer sides of the pair of first protective films, respectively, by performing electrolytic plating with respect to each of the chip substrates, second protective film removing step for removing the second protective film after the external electrode formation step, the pair of first protective films comprises an insoluble material having the property of not being soluble in a solvent used in the second protective film removal step, the second protective film is made of a soluble material having a property of being soluble in a solvent used in the second protective film removing step, wherein surface height of the second protective film is set to be lower than surface height of the pair of first protective films.

2. The method of manufacturing a sulfidation detection sensor according to claim 1, further comprising an internal electrode forming step of forming a pair of internal electrodes on the main surface of the large-sized substrate so as to be connected to both end portions of the sulfidation detection conductor, respectively, wherein the pair of first protective films is formed so as to cover overlapping portions in which the sulfidation detection conductor overlaps with each of the pair of internal electrodes.

3. The method of manufacturing a sulfidation detection sensor according to claim 1, further comprising:

a resistor forming step of forming a pair of resistors on the main surface of the large-sized substrate so as to be connected to both end portions of the sulfidation detection conductor, respectively;

an internal electrode forming step of forming a pair of internal electrodes that is connected to the pair of resistors, respectively; and a trimming step of forming trimming grooves on the pair of resistors to adjust resistance values, wherein each of the first protective films has an undercoat layer and an overcoat layer which cover corresponding one of the pair of resistors, and the pair of external electrodes is formed so as to cover the pair of internal electrodes, respectively.

4. The method of manufacturing a sulfidation detection sensor according to claim 1, further comprising:

an internal electrode forming step of forming an internal electrode on the main surface of the large-sized substrate so as to face one end portion of the sulfidation detection conductor with a space therebetween;

a resistor forming step of forming a resistor that connects between the sulfidation detection conductor and the internal electrode; and a trimming step of forming a trimming groove on the resistor to adjust a resistance value, wherein one of the first protective films has an undercoat layer and an overcoat layer which cover the resistor while the other one of the first protective films is formed on the sulfidation detection conductor.

* * * * *